United States Patent [19]

Yamaue et al.

[11] Patent Number: 4,908,603

[45] Date of Patent: Mar. 13, 1990

[54] LIGHT EMITTING ALARM BOARD

[76] Inventors: Satoshi Yamaue, Kiyomi-so, 7-1, Nishikitsuji-kawara-machi, Nara-shi, Nara-ken, Japan; Koichi Tanaka, 1-243-1, Minamikidera-cho, Nara-shi, Nara-ken, Japan; Hiroaki Nakaya, 2613-1, Ichinomoto-cho, Tenri-shi, Nara-ken, Japan; Takuo Yamashita, 99-2, Toyoi-cho, Tenri-shi, Nara-ken, Japan; Masaru Yoshida, 5-6-1, Tatsuta-kita, Ikaruga-cho, Ikoma-gun, Nara-ken, Japan

[21] Appl. No.: 338,410

[22] Filed: Apr. 11, 1989

Related U.S. Application Data

[63] Continuation of Ser. No. 149,637, Jan. 28, 1988, abandoned.

[30] Foreign Application Priority Data

Feb. 4, 1987 [JP] Japan .................................. 62-23968

[51] Int. Cl.$^4$ .......................... G08B 25/00; B60Q 1/00

[52] U.S. Cl. ...................................... 340/525; 340/461; 340/781; 313/503; 313/506; 428/690; 428/917

[58] Field of Search ............... 340/525, 438, 461, 459, 340/781; 313/503, 506; 428/1, 690, 917

[56] References Cited

U.S. PATENT DOCUMENTS

| | | | |
|---|---|---|---|
| 4,666,793 | 5/1987 | Hirate | 313/503 |
| 4,717,606 | 1/1988 | Hale | 313/503 |
| 4,717,858 | 1/1988 | Tanaka et al. | 313/503 |
| 4,727,004 | 2/1988 | Tanaka et al. | 313/503 |
| 4,730,146 | 3/1988 | Maser et al. | 313/503 |
| 4,741,976 | 5/1988 | Eguchi et al. | 313/503 |

*Primary Examiner*—Donnie L. Crosland

*Attorney, Agent, or Firm*—Flehr, Hohbach, Test, Albritton & Herbert

[57] ABSTRACT

A light-emitting alarm board uses thin-film EL elements which emit light of different colors individually or simultaneously, depending on the voltages applied thereon, thereby serving as display lamps for indicating the conditions of operation of a system being monitored.

6 Claims, 2 Drawing Sheets

LIGHT EMITTING ALARM BOARD

This is a continuation of application Ser. No. 149,637 filed Jan. 28, 1988, now abandoned.

BACKGROUND OF THE INVENTION

This invention relates to a color light-emitting alarm board which uses multicolor thin-film electroluminescence (EL) elements as display lamps.

Conventionally, light-emitting diodes and pilot lamps have been used as display lamps for alarm boards, control boards and measurement instruments. These lamps are conventionally so operated that green or blue light will be emitted when the apparatus being monitored is switched off or being operated normally and red light will be emitted when the apparatus is switched on or is operating abnormally. In certain applications, yellow lamps are also utilized. Since each display lamp of a conventional type can emit light of only one color, as many lamps are required as the number of different colors in which displays are desired. In the case of a measurement instrument with many switches or a control board for displaying many modes of operation, the total number of required display lamps may become unreasonably large and the user may find it difficult to readily understand the display indicating the detailed condition of the operation.

SUMMARY OF THE INVENTION

It is therefore an object of the present invention to provide a light-emitting alarm board with a simplified system of display lamps.

The above and other objects of the present invention are achieved by providing measurement instruments, control boards and the like which use multicolor thin-film EL elements as their display lamps.

BRIEF DESCRIPTION OF THE DRAWINGS

The accompanying drawings, which are incorporated in and form a part of the specification, illustrate some embodiments of the present invention and, together with the description, serve to explain the principles of the invention. In the drawings.

DETAILED DESCRIPTION OF THE INVENTION

Many kinds of light-emitting centers which determine the color of light emitted from a thin-film EL element are currently known. It is known, for example, that red light is obtained if calcium sulfide (CaS) containing europium (Eu) is used in the light-emitting layer, that yellowish orange light is obtained if zinc sulfide (ZnS) containing manganese (Mn) is used, that green light is obtained if zinc sulfide (ZnS) containing terbium fluoride ($TbF_3$) is used, and that bluish green light is obtained if strontium sulfide (SrS) containing cesium (Ce) is used. A multicolor display can therefore be achieved by stacking such EL elements emitting different colors or arranging them on a same plane.

Figure 2:
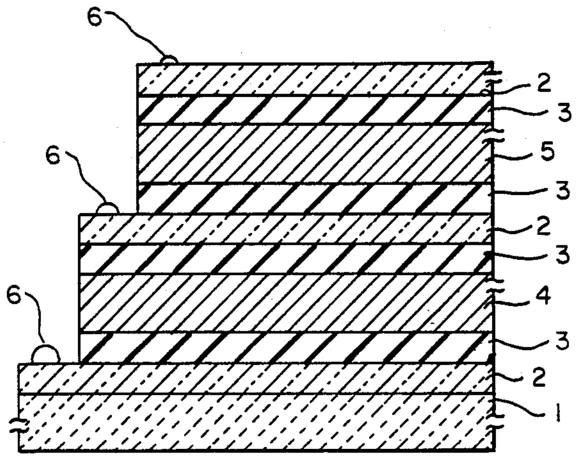
FIG. 2 is a sectional view of a portion of multicolor thin-film EL elements used in the alarm board of FIG. 1.

In FIG. 2 which shows a structure with two EL elements with different colors of emitted light stacked one on top of the other, numeral 1 indicates a substrate, numerals 4 and 5 indicate light-emitting layers which emit light of different colors, each being sandwiched between a pair of insulating films 3, and numerals 2 indicate electrically conductive transparent films serving as electrodes. Each of these transparent electrodes 2 is provided with a lead terminal 6. If a potential difference is applied between two of these lead terminals 6 sandwiching the upper light-emitting layer 5 or the lower light-emitting layer 4, EL light of the corresponding color can be obtained. If potential differences are applied simultaneously to the pairs of these lead terminals 6, an intermediate color can be obtained, depending on the brightness of the light from each light-emitting layer. The ratio of brightness between the two layers 4 and 5 can be varied freely by controllably adjusting the potential differences applied thereacross. If zinc sulfide containing terbium fluoride is used as the upper light-emitting layer 5 and calcium sulfide containing europium is used as the lower light-emitting layer 4 to form a stacked thin-film element as shown in FIG. 2, for example, red, green and an intermediate color thereof such as yellowish orange, yellow and yellowish green can be obtained.

Figure 1:
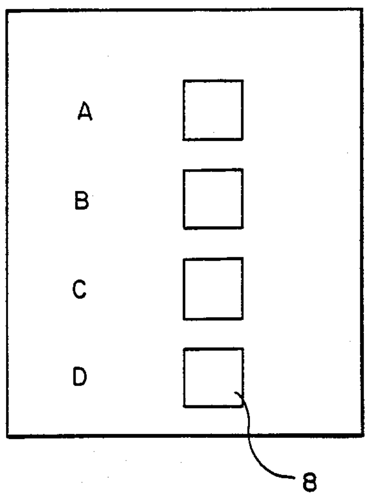
FIG. 1 is a plan view of an alarm board embodying the present invention with multicolor thin-film EL elements used as its display lamps.
Figure 3:
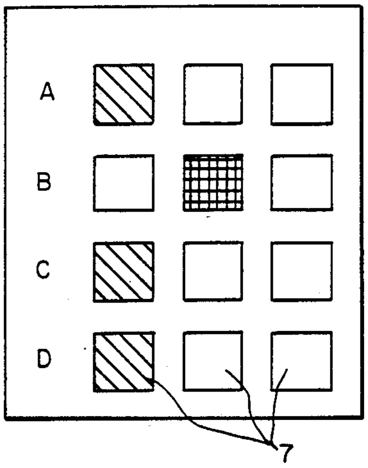
FIG.-3 (PRIOR ART)
FIG. 3 is a plan view of a prior art alarm board having the same capability as the alarm board of FIG. 1, FIGS. 4A, 4B and 4C are plan views of display according to other embodiments of the present invention.

Let us consider an electric control board using multicolor EL elements to display the conditions of operation of various machines, devices, instruments, etc. in terms of "normal", "warning" and "danger". If monochromatic display lamps are used for this purpose, three lamps of different colors are need for each machine, etc. as shown in FIG. 3. If there are many machines, etc. to be monitored, therefore, a large number of display lamps 7 are required on the control board and the user will find it difficult to understand the overall condition and the possibility of an error in the operation increases accordingly. If these display lamps 7 are replaced by the multicolor thin-film EL elements of the present invention described above, however, the number of display lamps 8 can be reduced significantly as shown in FIG. 1 because displays in many different colors can be effected by each lamp.

Figure 4A:
Figure 4B:
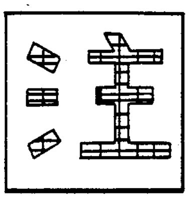
Figure 4C:
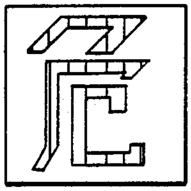

Thin-film EL elements can not only be switched on and off but also be used to display different patterns. Although liquid crystals and cathode ray tubes can also be used as pattern display elements, they are not as practical as multicolor EL elements because liquid crystals do not themselves emit light and cathode ray tubes cannot be made as thin as an EL element. FIGS. 4A, 4B and 4C show examples of thin-film film EL elements serving as pattern display lamps. FIG. 4A shows an element for displaying a pattern of "OK" in green to indicate a condition of normal operation. FIG. 4B shows an element for displaying a pattern of kanji character for "warning" in yellow to indicate a condition requiring attention. FIG. 4C shows an element for displaying a pattern of kanji character for "danger" in red to indicate the existence of a dangerous condition. The condition of operation of a machine or the like being monitored can thus be understood more clearly and immediately.

Figure 5:
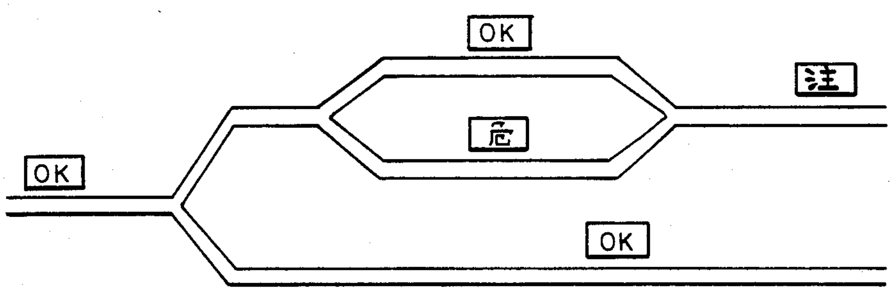
FIG. 5 is a plan view of a control board the present invention for train operations.

FIG. 5 shows an example of control board displaying the condition of operation of trains. Multicolor thin-film EL elements are used for each segment between switches for effecting color displays.

In summary, alarm boards of the present invention use multicolor thin-film EL elements as display lamps instead of light-emitting diodes or pilot lamps as used on conventional alarm boards such that the required number of display lamps can be reduced. If lamps for pattern display are used, it can be made still easier to obtain information from an alarm board.

The foregoing description of preferred embodiments of the invention has been presented for purposes of illustration and description. It is not intended to be exhaustive or to limit the invention to the precise forms disclosed, and many modifications and variations are possible in light of the above teaching. Such modifications and variations that may be apparent to a person skilled in the art are intended to be included within the scope of this invention.

What is claimed is:

1. A light-emitting alarm board comprising a board, and a plurality of thin-film EL elements adapted to emit light of different colors according to voltages applied thereon, said EL elements being stacked on said board and one on top of another in the direction of light emission therefrom, each of said EL elements being provided with an electrode terminal such that one or more of said EL elements can be selectably caused to emit light of one of said different colors or an intermediate color of said different colors, said alarm board thereby serving as display lamps for indicating the condition of operation of a system being monitored.

2. The light-emitting alarm board of claim 1 wherein each of said thin-film EL elements comprises a light-emitting layer and insulating layers sandwiching said light-emitting layer.

3. The light-emitting alarm board of claim 1 wherein said plurality of thin-film EL elements are mutually separated by a transparent conductive layer serving as an electrode.

4. The light-emitting alarm board of claim 1 wherein each of said thin-film EL elements serves to display a pattern in a selected color.

5. The light-emitting alarm board of claim 1 comprising two thin-film EL elements.

6. The light-emitting alarm board of claim 5 wherein said different colors are red and green, said light-emitting alarm board being adapted to selectably emit light of red, green, yellowish orange, yellow and yellowish green.

* * * * *